United States Patent
Goda

(10) Patent No.: US 8,949,641 B2
(45) Date of Patent: Feb. 3, 2015

(54) INFORMATION PROCESSING APPARATUS AND METHOD FOR CONTROLLING INFORMATION PROCESSING APPARATUS RESTORATION ORDER OF IMAGES THAT REDUCES THE WAITING TIME WHEN RESTORATION FROM A HIBERNATION STATE

(75) Inventor: Keigo Goda, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 850 days.

(21) Appl. No.: 12/717,405

(22) Filed: Mar. 4, 2010

(65) Prior Publication Data

US 2010/0262853 A1    Oct. 14, 2010

(30) Foreign Application Priority Data

Apr. 14, 2009   (JP) .................. 2009-098488

(51) Int. Cl.
G06F 1/00     (2006.01)
G06F 9/46     (2006.01)
(52) U.S. Cl.
CPC ...................... *G06F 9/461* (2013.01)
USPC ............ 713/323; 713/320; 713/322; 718/107
(58) Field of Classification Search
CPC ..................... G06F 1/00; G06F 9/46
USPC ............ 713/320, 322, 323; 718/107
See application file for complete search history.

(56) References Cited

U.S. PATENT DOCUMENTS

| | | | | |
|---|---|---|---|---|
| 6,385,721 B1 * | 5/2002 | Puckette | ............................ | 713/2 |
| 2007/0061556 A1 * | 3/2007 | Rothman et al. | .................. | 713/1 |
| 2007/0250730 A1 * | 10/2007 | Reece et al. | .................. | 713/323 |
| 2007/0260867 A1 * | 11/2007 | Ethier et al. | ...................... | 713/2 |
| 2008/0005541 A1 * | 1/2008 | Hase et al. | ..................... | 712/228 |
| 2009/0063837 A1 * | 3/2009 | Shayer et al. | ...................... | 713/2 |
| 2011/0252430 A1 * | 10/2011 | Chapman et al. | ............. | 718/107 |

FOREIGN PATENT DOCUMENTS

JP    2007334383 A    12/2007

* cited by examiner

*Primary Examiner* — Mohammed Rehman
*Assistant Examiner* — Terrell Johnson
(74) *Attorney, Agent, or Firm* — Fitzpatrick, Cella, Harper & Scinto

(57) ABSTRACT

An information processing apparatus that shortens the waiting time that a user feels when restoration from a hibernation state is performed, a method for controlling the same, and a recording medium are provided. To accomplish this, when restoration from a power saving state (hibernation state) is performed, the information processing apparatus of the present invention restores only an operating system (OS) to a state of an execution in a main storage memory (RAM), and thereafter restores processes in the OS to a state of an execution. Further, the OS sequentially transfers images of the processes to the RAM from a non-volatile storage apparatus, and resumes execution of the processes from a process for which transfer is complete.

19 Claims, 16 Drawing Sheets

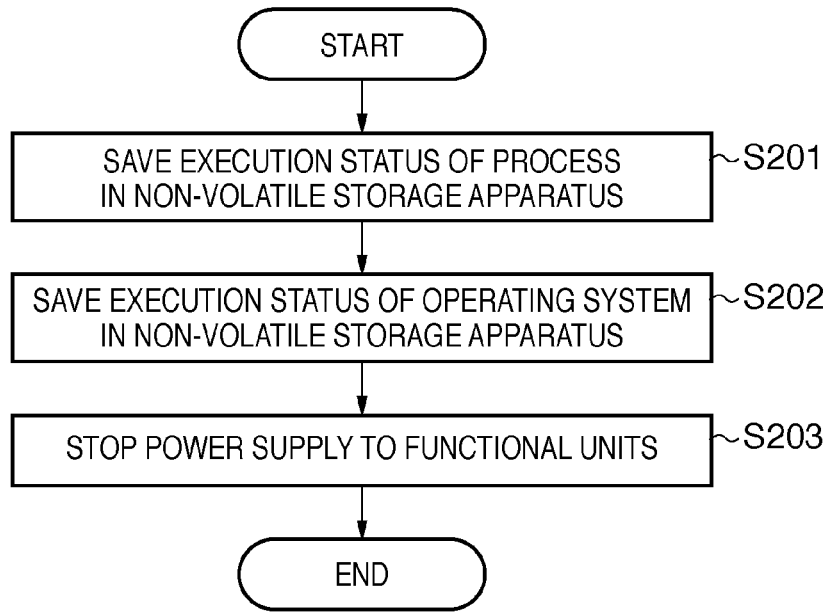
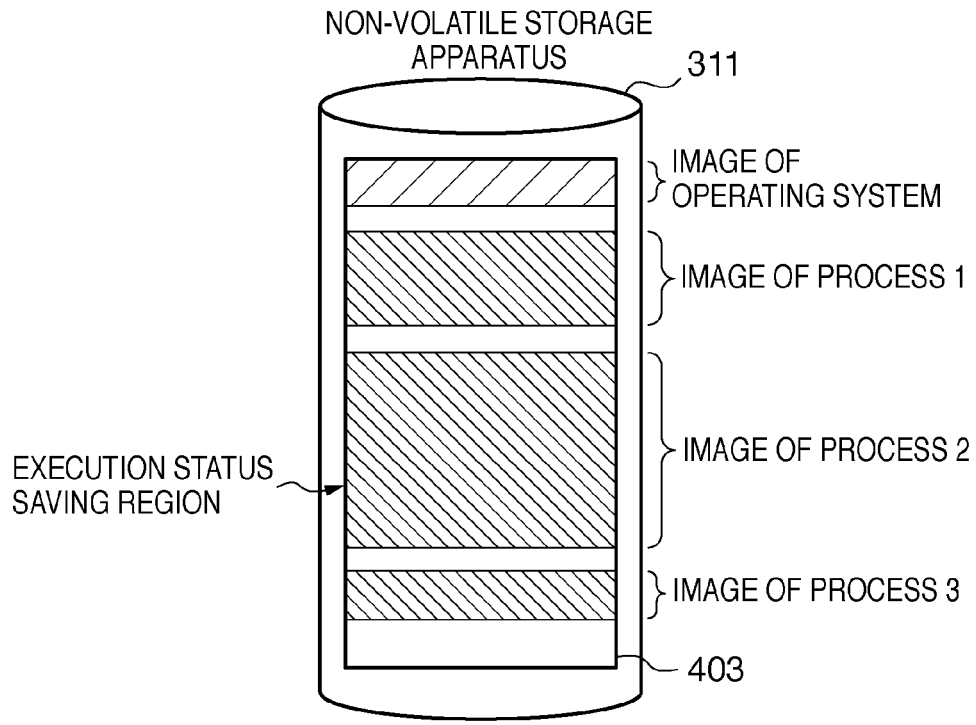

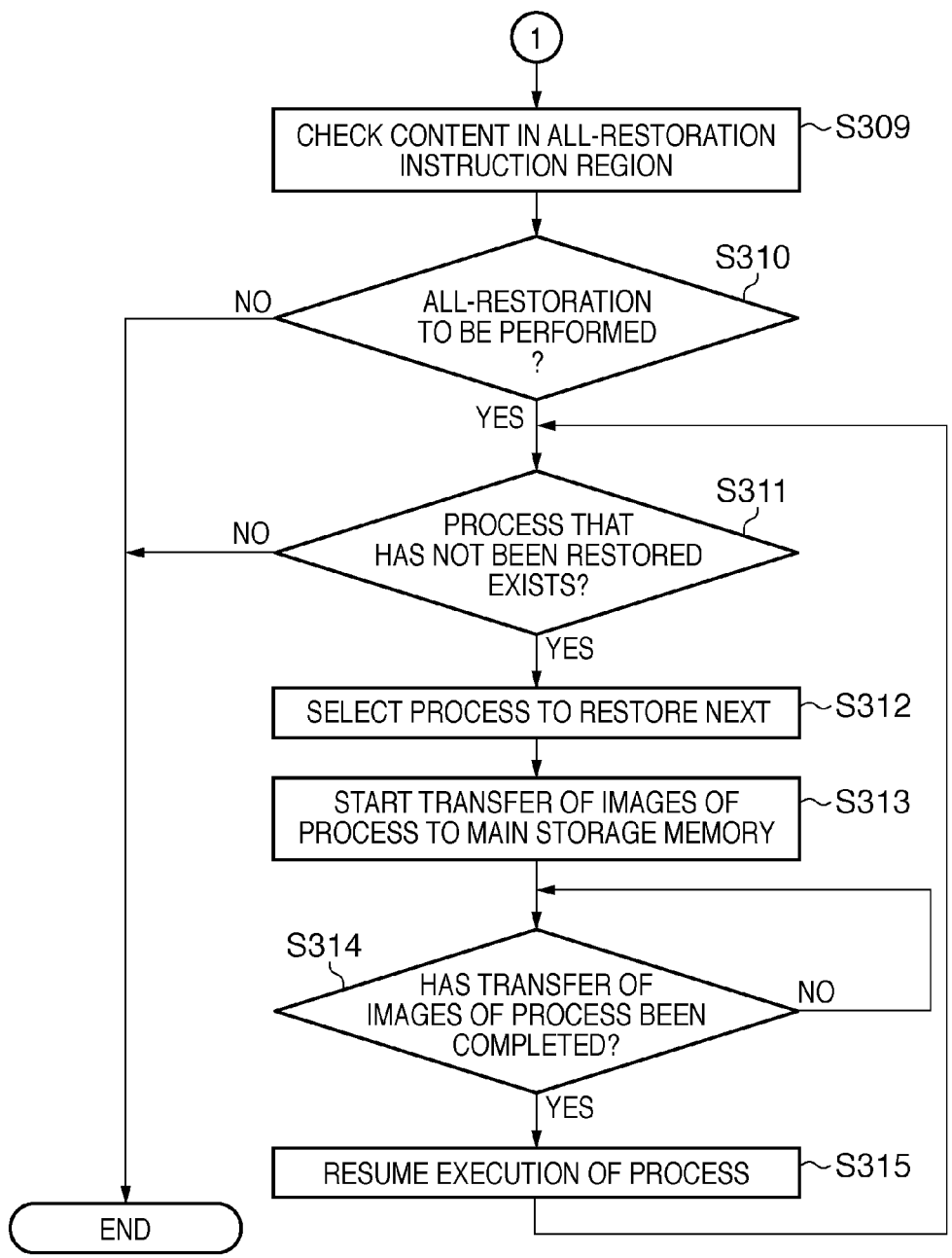

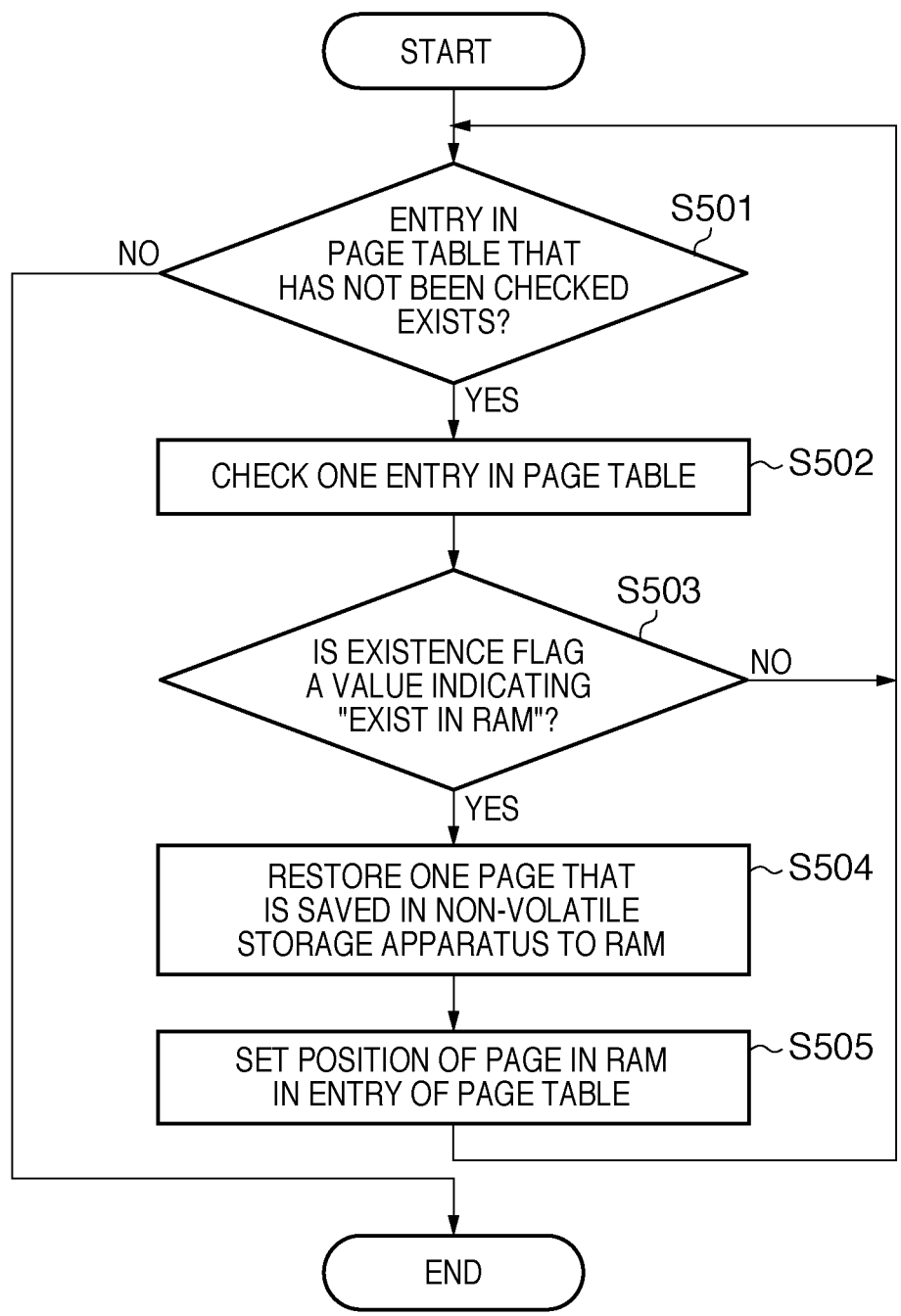

INFORMATION PROCESSING APPARATUS AND METHOD FOR CONTROLLING INFORMATION PROCESSING APPARATUS RESTORATION ORDER OF IMAGES THAT REDUCES THE WAITING TIME WHEN RESTORATION FROM A HIBERNATION STATE

BACKGROUND OF THE INVENTION

1. Field of the Invention

The present invention relates to an information processing apparatus, such as a personal computer or a digital multi-function peripheral, a method for controlling the information processing apparatus, and a recording medium.

2. Description of the Related Art

In recent years, as the awareness of the global environment increases, there is a higher demand for energy-saving information processing apparatuses, such as a personal computer and a digital multi-function peripheral. To help save energy, there are an increasing number of cases in which a function called "hibernation" is provided in information processing apparatuses in order to reduce power consumption in a waiting state. Hibernation is a technique in which an information processing apparatus that is operating saves, in a non-volatile storage apparatus such as a hard disk drive (HDD), the content (hereinafter, referred to as "images") in a main storage memory (RAM) before power supply is stopped, and restores the images in the RAM when power is again supplied to the apparatus. In the information processing apparatus that is in a power saving state (hibernation state), since power supply to most of the components in the apparatus including the RAM is stopped, power consumption is greatly suppressed. Moreover, at the time of restoration from the hibernation state, it is possible to reconstruct a state that does not feel any different to a user compared to before switching to the hibernation state, and thus hibernation is an extremely useful technique. Hibernation is widely utilized in personal computers and digital multi-function peripherals. For example, such an apparatus stops the power supply by itself if a specified time elapses in which the user does not perform any operation, and an operation performed on a keyboard or an operation panel by the user triggers the power supply again, so that the apparatus is restored to the state before the power supply was stopped.

Further, in recent years, as information processing apparatuses are provided with greater functionality, the time necessary for the information processing apparatuses to start up is becoming longer, and accordingly hibernation is used more often as a technique to cope with this. For example, an information processing apparatus saves the content of the RAM in an active state in a non-volatile storage apparatus, and expands the content to the RAM when starting up, thus shortening the startup time.

However, with the conventional hibernation technique, the execution of programs is not resumed until all the images created in the non-volatile storage apparatus have been expanded to the RAM, and restoring processing is complete, and consequently a problem occurs that the waiting time for the user is longer as the size of the images to be created is greater. Although one countermeasure to this problem is the acceleration of the transfer rate when transferring images to the RAM from the non-volatile storage apparatus used as a saving destination, such as a hard disk or a flash memory, there is a physical limit to the acceleration of the transfer rate, and thus it is not easy to realize this.

In addition, many of the information processing apparatuses in recent years adopt a multitask operating system (multitask OS), and simultaneously execute many processes. There are some processes to be executed that, even in the case of being restored from the hibernation state, need to be reinitialized or re-set after restoration due to constraints of related hardware and the like. It is desirable to resume the operation of such processes as quickly as possible after restoration. Further, it is desirable to quickly resume the operation of a process that greatly influences the startup time that the user feels, such as a process related to an input apparatus or a display apparatus.

In view of this, to address the problems described above, a technique has been proposed in which, before all the images are expanded to the RAM at the time of restoration from the hibernation state, the execution of a program is resumed when some of the images has been expanded. For example, in Japanese Patent Laid-Open No. 2007-334383, an information processing apparatus is proposed in which the execution of a program is resumed in parallel with the transfer of images to the RAM in the background, and if it is detected that a memory region to which an image has not been transferred is accessed by the resumed program, an image corresponding to that memory region is immediately obtained.

However, the above conventional technique has the following problems. An example of such problems is that in restoring processing for restoration from the hibernation state, if a process that has resumed its operation is a program that makes many memory accesses immediately after resumption, transfer processing with respect to a memory region to which an image has not been transferred is frequently performed. In this case, most of the actual time is spent on image transfer processing, which makes the time period for which the execution of a program is actually stopped longer. As a result, the user operating the information processing apparatus will have an impression that the operation of the apparatus is extremely slow. Particularly, in the information processing apparatus that adopts a multitask OS, since a plurality of processes respectively operate in an independent manner, and each of the processes simultaneously accesses a different memory region, the problem described above tends to occur. As described above, if image transfer processing based on a memory access made by the processes is frequently performed, the effect of shortening the waiting time for the user is diminished due to the resumption of process execution in parallel with transfer processing.

SUMMARY OF THE INVENTION

The present invention has been conceived in view of the above problems, and provides an information processing apparatus that can shorten the waiting time that the user feels at the time of restoration from the hibernation state, a method for controlling the same, and a recording medium.

One aspect of the present invention provides an information processing apparatus comprising: a main storage unit that loads an operating system that can simultaneously execute a plurality of processes and execution programs of the plurality of processes; a non-volatile storage unit that stores execution status information of the operating system and each process that are being executed in the main storage unit; a switching unit that switches between an active state in which power is supplied to a plurality of devices included in the information processing apparatus, and a power saving state in which power is supplied to at least one device among the plurality of devices, and power supply to the other devices different from the at least one device is decreased; a saving unit that saves, when the switching unit switches from the active state to the power saving state, the execution status information of the operating system and each process that are being executed from the main storage unit to the non-volatile storage unit; a first restoration unit that, when restoration from the power saving state to the active state is performed, transfers the execution status information of the operating system from the non-volatile storage unit to the main storage unit, and restores the operating system to a state of an execution; and a second restoration unit that sequentially transfers the execution status information of the plurality of processes one by one from the non-volatile storage unit to the main storage unit, and restores the plurality of processes to a state of an execution by resuming execution from a process for which transfer is complete.

Another aspect of the present invention provides a method for controlling an information processing apparatus including a main storage unit that loads an operating system that can simultaneously execute a plurality of processes and execution programs of the plurality of processes, and a non-volatile storage unit that stores execution status information of the operating system and each process that are being executed in the main storage unit, the method comprising: switching, by a switching unit, between an active state in which power is supplied to a plurality of devices included in the information processing apparatus, and a power saving state in which power is supplied to at least one device among the plurality of devices, and power supply to the other devices different from the at least one device is decreased; saving, by a saving unit, when switching from the active state to the power saving state is performed in the switching step, the execution status information of the operating system and each process that are being executed from the main storage unit to the non-volatile storage unit; when restoration from the power saving state to the active state is performed, transferring, by a first restoration unit, the execution status information of the operating system from the non-volatile storage unit to the main storage unit, and restoring the operating system to a state of an execution; and sequentially transferring, by a second restoration unit, the execution status information of the plurality of processes one by one from the non-volatile storage unit to the main storage unit, and restoring the plurality of processes to a state of an execution by resuming execution from a process for which transfer is complete.

According to the present invention, it is possible to provide an information processing apparatus that can shorten the waiting time that the user feels, for example, at the time of restoration from the hibernation state, a method for controlling the same, and a recording medium.

Further features of the present invention will become apparent from the following description of exemplary embodiments with reference to the attached drawings.

BRIEF DESCRIPTION OF THE DRAWINGS

FIG. 8 is a flowchart showing a processing procedure performed at a time of switching to a hibernation state in the digital multi-function peripheral 100 according to the first embodiment.

FIG. 9 is a diagram showing a state of an execution status saving region 403 when switching to the hibernation state is completed in the digital multi-function peripheral 100 according to the first embodiment.

FIGS. 10A and 10B are flowcharts showing a processing procedure performed at a time of restoration from the hibernation state in the digital multi-function peripheral 100 according to the first embodiment.

FIG. 18 is a flowchart showing a processing procedure performed at a time of restoring an execution status of each process to the RAM 304 in the digital multi-function peripheral 100 according to the second embodiment.

DESCRIPTION OF THE EMBODIMENTS

First Embodiment

Configuration of Information Processing Apparatus

Hereinafter, a first embodiment of the present invention is described with reference to FIGS. 1 to 12. Note that in the present embodiment, a description is given regarding a digital multi-function peripheral, as an example of an information processing apparatus.

Figure 1:
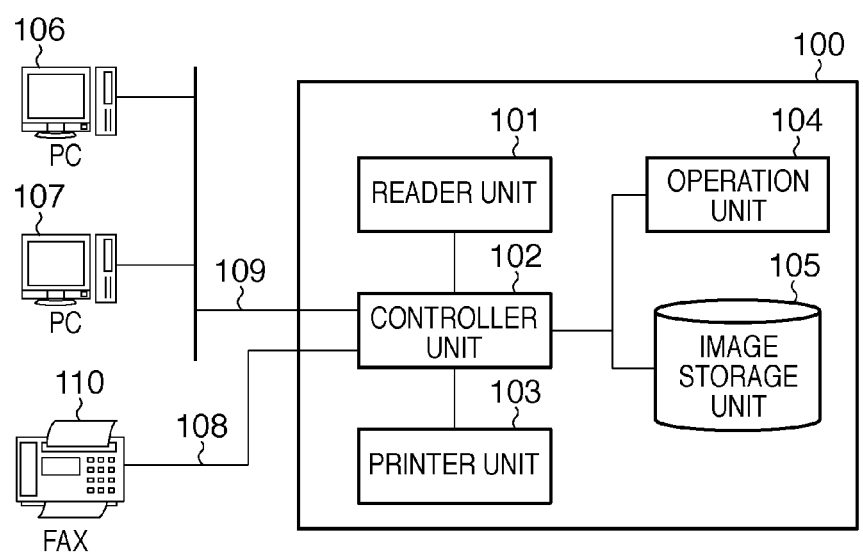
FIG. 1 is a diagram showing an example of a block configuration of a digital multi-function peripheral 100 according to a first embodiment.

FIG. 1 shows an example of a block configuration of a digital multi-function peripheral 100 according to the first embodiment. The digital multi-function peripheral 100 is provided with functional units (devices), such as a reader unit 101, a printer unit 103, an operation unit 104, and an image storage unit 105, and a control apparatus (controller unit) 102 that controls the functional units. The controller unit 102 is constituted from a single electronic component, and connected to the functional units.

The reader unit 101 is an image reading apparatus that performs image data reading processing using a CCD or the like. The printer unit 103 is a printer that performs image data output processing, and can execute color and monochrome printing using an electrophotographic system or the like. The operation unit 104 is provided with a keyboard that performs an image data input/output operation, and a liquid crystal panel for, for example, displaying/setting image data and various functions. Further, the image storage unit 105 is an apparatus that stores/saves image data read by the reader unit 101, FAX document data received via a telephone line 108, and image data received from host computers 106 and 107 via a network 109, such as a LAN.

The controller unit 102 provides various functions of the digital multi-function peripheral 100 by controlling functional units, such as the reader unit 101, the printer unit 103, the operation unit 104, and the image storage unit 105. For example, the controller unit 102 provides a copy function for reading image data of an original by controlling the reader unit 101, and outputting the image data to a recording sheet by controlling the printer unit 103. Further, in addition to the copy function, the controller unit 102 provides the following functions. For example, the controller unit 102 provides a scanner function for converting image data read by the reader unit 101 into coded data, and transmitting the resultant data to the host computers 106 and 107 via the network 109. Furthermore, the controller unit 102 provides a printer function for converting coded data received from the host computers 106 and 107 via the network 109 into image data, and outputting the resultant data to the printer unit 103, and a FAX function for transmitting and receiving document data between the digital multi-function peripheral 100 and a FAX terminal 110 via the telephone line 108.

Figure 2:
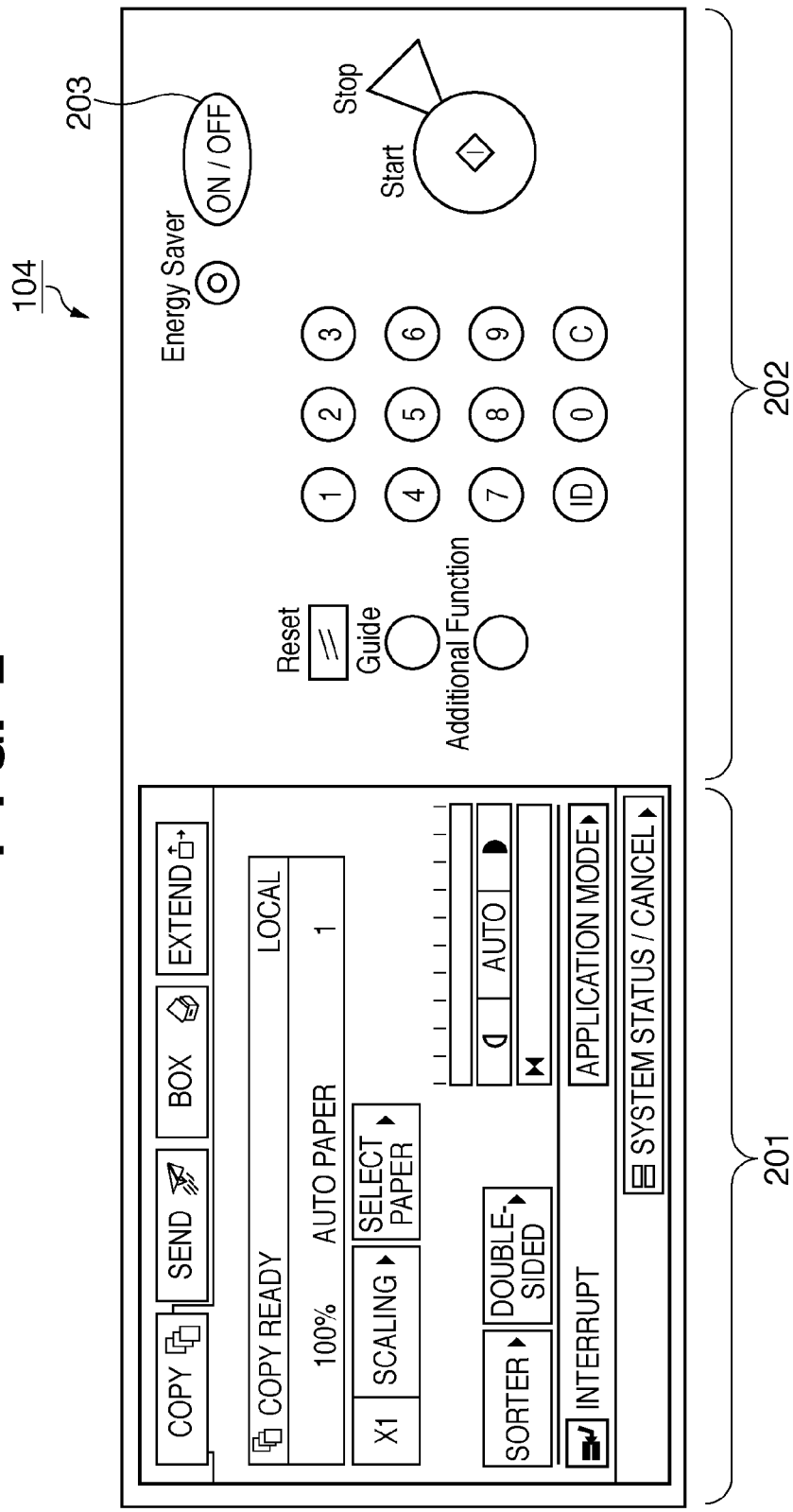
FIG. 2 is a diagram showing an example of an operation unit 104 of the digital multi-function peripheral 100 according to the first embodiment.

FIG. 2 shows an example of the operation unit 104 of the digital multi-function peripheral 100 according to the first embodiment. The operation unit 104 is provided with a liquid crystal panel 201 and a keyboard 202. Further, the keyboard 202 is provided with, for example, a power saving state cancel button 203, which is an operation button via which a user gives an instruction, in the case where the digital multi-function peripheral 100 has been switched to a power saving state (hibernation state), to the digital multi-function peripheral 100 to cancel that state.

By operating the operation unit 104, the user can select a function (the copy function, the print function, the FAX function, and the like) to be executed by the digital multi-function peripheral 100, or can give an instruction to start an operation performed by the function. Furthermore, the user can also set details of the operations performed by the selected function. Accordingly, for example, in the case of the copy function, various copy modes (double-sided setting, grouping, sorting, staple output, and the like) can be set. Note that such instructions may be realized by using the keyboard 202 (hard keys), and/or soft keys displayed on the liquid crystal panel 201.

Figure 3:
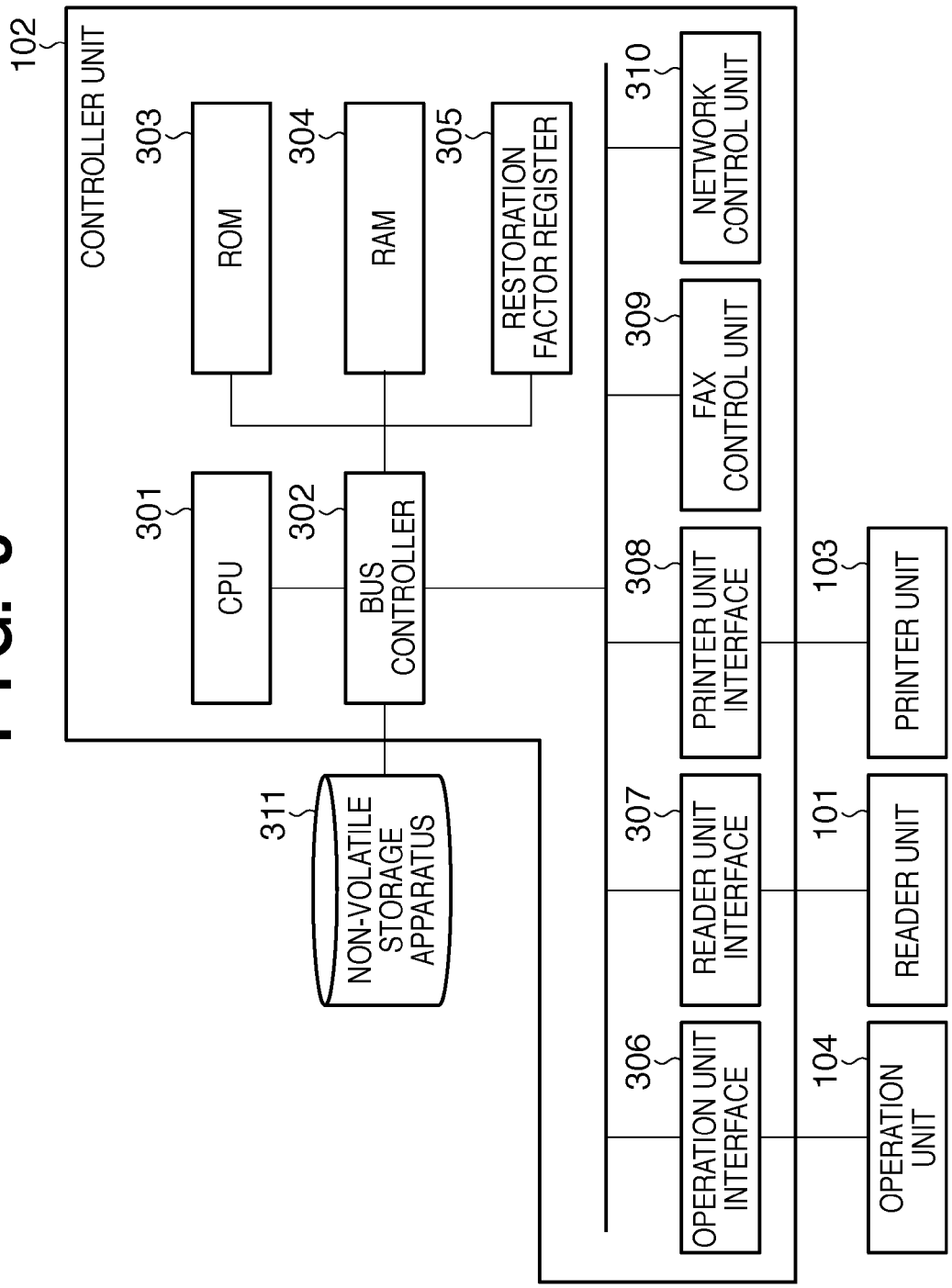
FIG. 3 is a diagram showing an example of a block configuration of a controller unit 102 of the digital multi-function peripheral 100 according to the first embodiment.

FIG. 3 is a diagram showing an example of a block configuration of the controller unit 102 of the digital multi-function peripheral 100 according to the first embodiment.

The controller unit 102 is provided with a CPU 301 that controls operation of the digital multi-function peripheral 100, and a ROM 303, a RAM 304, and a restoration factor register 305 that are connected to the CPU 301 via a bus controller 302.

The RAM 304 is a main memory for holding computer program code executed by the CPU 301, image data that is to be processed by the CPU 301, and the like, and is constituted from a volatile storage element, that is, ordinarily a DRAM. Normally, an operating system (OS), and execution programs for processes executed by the OS are loaded in the RAM 304. Further, the ROM 303 has stored therein an initial program called a BIOS (Basic Input Output System) that checks and initializes hardware when the digital multi-function peripheral 100 is powered on.

When the digital multi-function peripheral 100 is restored from the hibernation state, the ID number of a functional unit that has given an instruction to cancel that state is stored in the restoration factor register 305. In other words, the ID number indicates a restoration factor when the digital multi-function peripheral 100 is restored from hibernation. The functional units of the digital multi-function peripheral 100 can give an instruction to the controller unit 102 to cancel the hibernation state. For example, the operation unit 104 gives an instruction to the controller unit 102 to cancel the hibernation state based on key input to the power saving state cancel button 203 from the user. At that time, the functional unit inputs a power-saving cancel signal to the controller unit 102, and also sets an ID number unique to the functional unit in the restoration factor register 305.

The CPU 301 is connected to a non-volatile storage apparatus 311 via the bus controller 302. The non-volatile storage apparatus 311 is a non-volatile storage medium that continues holding data even if a power supply is interrupted, and is typified by a hard disk drive (HDD). Note that the non-volatile storage apparatus 311 may be a flash memory or the like.

The controller unit 102 is further provided with an operation unit interface 306, a reader unit interface 307, a printer unit interface 308, a FAX control unit 309, and a network control unit 310, and those units are connected to the CPU 301 via the bus controller 302. The operation unit 104, the reader unit 101, and the printer unit 103 are respectively connected to the operation unit interface 306, the reader unit interface 307, and the printer unit interface 308. The interfaces control commands between the above units and the connected apparatus.

The FAX control unit 309 expands image data transmitted via a telephone line (not shown), or compresses image data, and transmits the compressed image data via the telephone line. The network control unit 310 is a controller that controls a network interface. Note that ordinarily, Ethernet (registered trademark) can be used for such a network. The CPU 301 can be connected to a personal computer and the like on the telephone line or the network via the bus controller 302 and the FAX control unit 309 or the network control unit 310.

State of Non-Volatile Storage Apparatus and State of RAM

Figure 4:
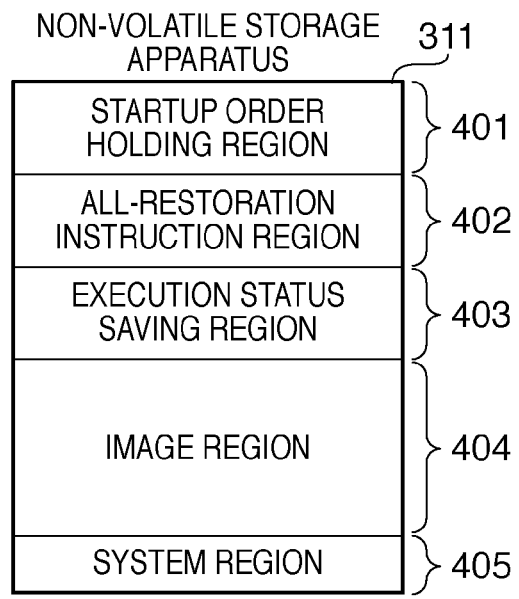
FIG. 4 is a diagram showing an example of storage content in a non-volatile storage apparatus 311 of the digital multi-function peripheral 100 according to the first embodiment.

FIG. 4 is a diagram showing an example of storage content in the non-volatile storage apparatus 311 of the digital multi-function peripheral 100 according to the first embodiment. As shown in FIG. 4, there are cases where the non-volatile storage apparatus 311 is utilized in a state of being divided into several partitions (regions). In the present embodiment, the non-volatile storage apparatus 311 is utilized in a state of being divided into five regions, namely a startup order holding region 401, an all-restoration instruction region 402, an execution status saving region 403, an image region 404, and a system region 405.

The startup order holding region 401 holds order information that indicates the order in which the operating system (OS) of the digital multi-function peripheral 100 resumes the execution of processes at the time of restoration from the hibernation state. The all-restoration instruction region 402 holds information that indicates whether or not the OS is to restore all the processes that were operating before switching to the hibernation state, at the time of restoration from the hibernation state. The execution status saving region 403 is a storage region in which the OS saves execution status information of each process in the RAM 304 (hereinafter, referred to as "images") at the time of switching to the hibernation state. For that region, a storage capacity that is at least equivalent to or greater than that of the RAM 304 is secured. The image region 404 is utilized as the image storage unit 105 of the digital multi-function peripheral 100. Further, the system region 405 has stored therein program code executed by the CPU 301, setting information regarding operation of the digital multi-function peripheral 100, and the like. Note that the startup order holding region 401, the all-restoration instruction region 402, and the system region 405 are in a state where prescribed content has been written therein in advance at a factory or the like, at the time of product shipment.

Figure 5:
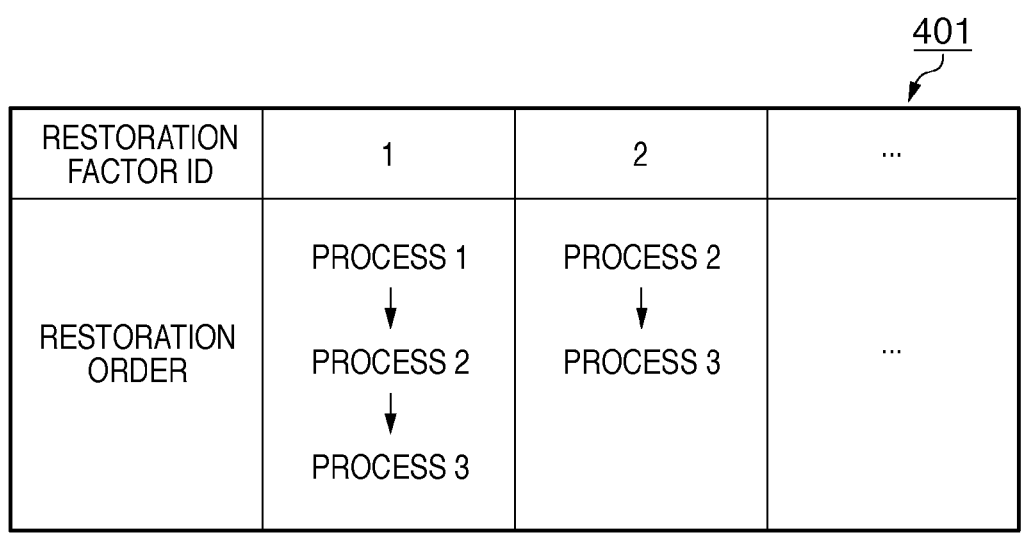
FIG. 5 is a diagram showing an example of content in a startup order holding region 401 of the digital multi-function peripheral 100 according to the first embodiment.

FIG. 5 is a diagram showing an example of content in the startup order holding region 401 of the digital multi-function peripheral 100 according to the first embodiment. Here, a restoration factor ID is an ID number that is uniquely assigned to each functional unit, and corresponds to the number that the restoration factor register 305 holds. For each restoration factor ID, the startup order holding region 401 holds information indicating an order in which the processes are to be restored by the OS that is restored prior thereto when the functional unit corresponding to the restoration factor ID gives an instruction to the controller unit 102 to cancel the hibernation state. Note that the order information does not necessarily include all the processes that exist in the RAM 304, and may include only some of the processes.

Figure 6:
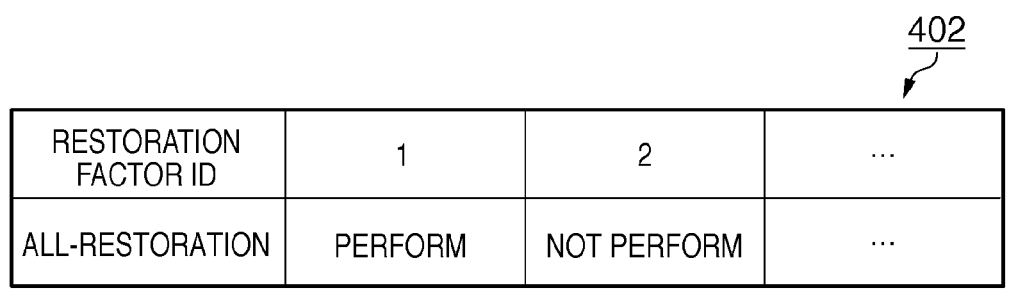
FIG. 6 is a diagram showing an example of content in an all-restoration instruction region 402 of the digital multi-function peripheral 100 according to the first embodiment.

FIG. 6 is a diagram showing an example of content in the all-restoration instruction region 402 of the digital multi-function peripheral 100 according to the first embodiment. Similar to the startup order holding region 401 shown in FIG. 5, restoration factor IDs correspond to the numbers that the restoration factor register 305 holds. For each restoration factor ID, the all-restoration instruction region 402 holds information that indicates whether or not all the processes are to be restored by the OS that is restored prior thereto.

The content in the startup order holding region 401 shown in FIG. 5 and the content in the all-restoration instruction region 402 shown in FIG. 6 correspond one to one, using the restoration factor IDs as a key. Regarding a specific restoration factor ID, if the content in the all-restoration instruction region 402 indicates "perform all-restoration", the OS interprets that the content in the startup order holding region 401 indicates processes to be restored first and the order thereof, at the time of restoration from the hibernation state based on an instruction from the functional unit having that ID. Furthermore, the OS interprets that regarding that ID, other processes that are not included in the order information in the startup order holding region 401 are to be restored after restoring processing for all the processes included in the information has been completed, and the restoration order of such other processes is not explicit. In this case, the OS may restore such other processes in an order in which the OS can easily transfer the images of each process to the RAM 304, an order determined by the OS itself, or a random order, for example.

On the other hand, if the content in the all-restoration instruction region 402 indicates "not perform all-restoration", the OS interprets that the content in the startup order holding region 401 indicates all the processes that are to be executed and resumed, and the order thereof at the time of restoration from hibernation. That is, the OS interprets that the execution of processes that are not indicated in the order will not be resumed.

Figure 7:
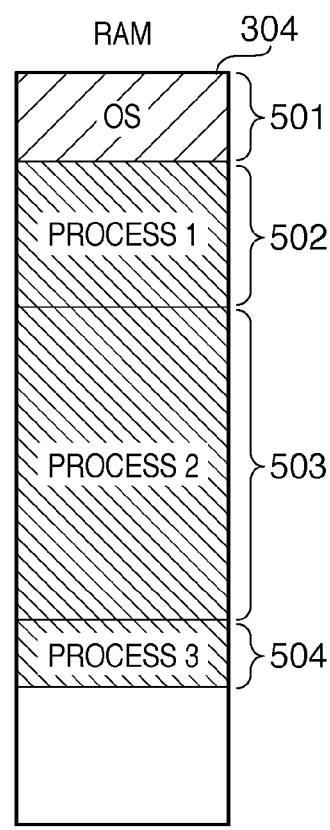
FIG. 7 is a diagram schematically showing a state of a RAM 304 in a state where the digital multi-function peripheral 100 according to the first embodiment has been started up.

FIG. 7 is a diagram schematically showing the state of the RAM 304 in the state where the digital multi-function peripheral 100 according to the first embodiment has been started up. Note that in the present embodiment, the CPU 301 and the OS of the digital multi-function peripheral 100 do not have a virtual memory function. Here, the OS mounted in the digital multi-function peripheral 100 according to the present embodiment is a multitask OS that can simultaneously execute a plurality of programs. Therefore, in the RAM 304, a plurality of processes, which are actual programs executed on the OS, exist. The OS and program code for application software are stored in advance in the system region 405 of the non-volatile storage apparatus 311, and loaded into the RAM 304 so as to be executed when the digital multi-function peripheral 100 is started up.

The processes shown in FIG. 7 are the following processes, for example. Process 1 is a process for controlling the operation unit 104. This process is for providing a user interface by giving an instruction to a job control process described below to perform an operation such as copying, or displaying the operation state of the digital multi-function peripheral 100 on the liquid crystal panel 201 when the user operates a button or the like of the operation unit 104. Process 2 is a job control process for controlling jobs executed by the digital multi-function peripheral 100. This process is for controlling the reader unit 101, the printer unit 103, and the like, thus realizing the central functions of the digital multi-function peripherals 100, such as a copy job and a print job. Process 3 is a communication control process, and is for receiving a document data print request from the personal computer and the like connected via the network, and receiving a FAX document via the telephone line. Further, Process 3 gives an instruction to print a document to Process 2 described above upon receiving the document data. Note that these processes are merely examples, and a configuration is of course possible in which other processes exist in the RAM 304.

Switching Processing for Switching to Hibernation State

Next, a description is given regarding switching processing for switching to the hibernation state in the digital multi-function peripheral 100 according to the present embodiment described above. FIG. 8 is a flowchart that shows a processing procedure at the time of switching to the hibernation state in the digital multi-function peripheral 100 according to the first embodiment.

First, in the digital multi-function peripheral 100 in an active state, based on a certain factor, an instruction is given to the OS to start switching to the hibernation state. For example, if the user does not operate the digital multi-function peripheral 100 for a specified time period, such an instruction may be automatically generated in the OS. Further, the user may explicitly give an instruction to the OS via the operation unit 104, or the like. The OS that has received such an instruction actually starts an operation of switching to the hibernation state.

In step S201, the OS saves process execution status information (images), such as storage content in the RAM 304 and the internal state of the CPU 301, in the execution status saving region 403 of the non-volatile storage apparatus 311. Furthermore, in step S202, the OS saves execution status information of the OS itself in the execution status saving region 403 of the non-volatile storage apparatus 311. After that, the processing proceeds to step S203.

In step S203, the OS stops power supply to the functional units, such as the controller unit 102, the reader unit 101, and the printer unit 103. By performing the above processing, switching to the hibernation state is completed in the digital multi-function peripheral 100. However, regarding the controller unit 102, only the power supply to the CPU 301, the RAM 304, and the like is stopped, and some functional units that have a function for giving an instruction to cancel the hibernation state, such as the operation unit 104, the network control unit 310, and the FAX control unit 309, are left in an energized state. Accordingly, an instruction to cancel the hibernation state is given from the functional units in an energized state to the controller unit 102 when necessary. Note that switching to the hibernation state may be performed not by completely stopping power supply to the functional units that are different from the functional units to which power is being supplied at the time of switching to the hibernation state as described above, but by decreasing power supply thereto. Using any of these methods, it is possible to reduce power consumption in the information processing apparatus.

Further, FIG. 9 is a diagram showing the state of the execution status saving region 403 when switching to the hibernation state has been completed in the digital multi-function peripheral 100 according to the first embodiment. In steps S201 and S202 described above, images of the OS itself and the processes are individually saved by the OS in the execution status saving region 403 of the non-volatile storage apparatus 311, as shown in FIG. 9.

Restoring Processing for Restoration from Hibernation State

Next, a description is given regarding restoring processing for restoration from the hibernation state according to the present embodiment. A feature of the digital multi-function peripheral 100 according to the present embodiment is that in restoring processing for restoration from the hibernation state, execution of a process that has already been restored is resumed before restoring images of all the processes. Accordingly, the digital multi-function peripheral 100 can, by resuming the execution of a process after having restored all the images of the process, prevent a stop in execution after the execution of the process has started.

Figure 10A:
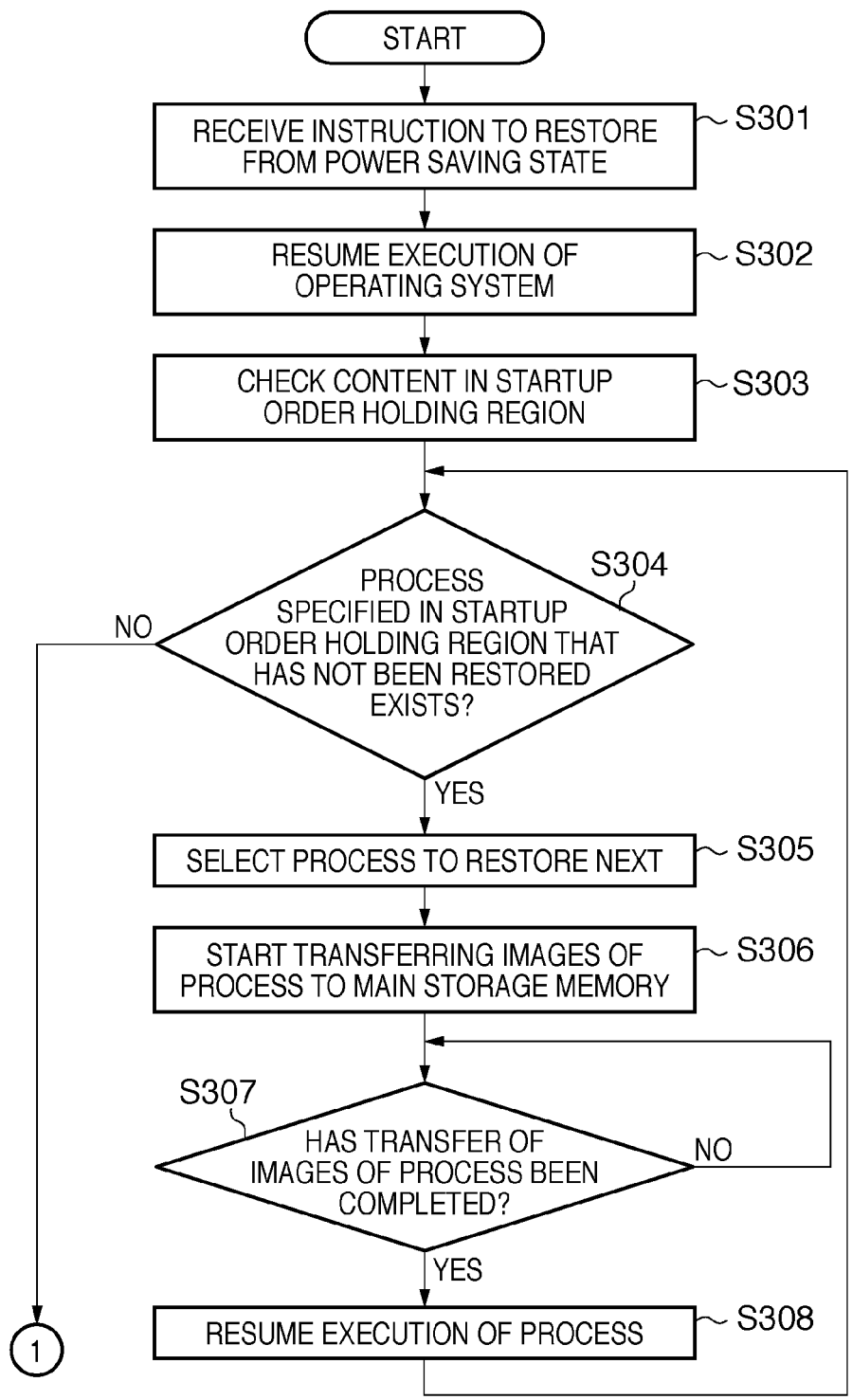

FIGS. 10A and 10B are flowcharts that show a processing procedure at the time of restoration from the hibernation state in the digital multi-function peripheral 100 according to the first embodiment.

In step S301, the controller unit 102 receives an instruction to cancel the hibernation state based on a certain restoration factor. Accordingly, the controller unit 102 starts restoring processing for restoration from the hibernation state. For example, such a cancel instruction is generated by the operation unit 104 if the power saving state cancel button 203 of the operation unit 104 is pressed. Further, if the FAX control unit 309 detects reception of a FAX signal, a cancel instruction is generated by the FAX control unit 309. The functional unit that generated the cancel instruction sets its unique ID number in the restoration factor register 305. Following this, power is supplied to the entire controller unit 102 in the digital multi-function peripheral 100. After that, the processing proceeds to step S302.

In step S302, the BIOS written in the ROM 303 resumes execution of the OS by loading the OS into the RAM 304. At that time, the OS is restored to the execution status from before the switching to the hibernation state, using the image of the OS itself stored in the non-volatile storage apparatus 311. Here, the digital multi-function peripheral 100 is in a state in which only the OS is executed, and no processes exist yet for which execution has been resumed. Note that the processing in step S302 corresponds to processing performed by a first restoration unit.

In step S303, the OS checks the content in the startup order holding region 401. Accordingly, the OS obtains restoration order information corresponding to the restoration factor ID held by the restoration factor register 305. After that, the processing proceeds to step S304.

In step S304, the OS determines whether or not a process exists that is specified in the restoration order information in the startup order holding region 401, and for which restoring processing has not been completed yet. If such a process exists, the processing proceeds to step S305 and processing for resuming execution of the process is continued. On the other hand, if no such process exists, the processing proceeds to step S309.

In step S305, the OS selects one process to restore in accordance with the order indicated by the restoration order information. Furthermore, in step S306, the OS starts transferring images of the selected process from the execution status saving region 403 of the non-volatile storage apparatus 311 to the RAM 304. After that, the processing proceeds to step S307.

In step S307, the OS determines whether or not the transfer of the images of the process has been completed. If it is determined that the transfer has not been completed, the transfer of the images of the process is continued. On the other hand, if it is determined that the transfer has been completed, the processing proceeds to step S308. After the transfer has been completed, the execution status of the process is restored to the state from before the switch to the hibernation state. After that, the processing proceeds to step S308. Note that regarding the determination processing, the OS determines whether or not all the images of the targeted process have been transferred from the non-volatile storage apparatus 311 to the RAM 304, for example. Alternatively, the OS may determine whether or not the size of the transferred images is the same as the memory usage of the process from before the switch to the hibernation state.

In step S308, the OS resumes execution of the process. The process for which execution has been resumed supplies power again to the functional unit related to the operation of the process, such as the operation unit 104 and the printer unit 103, so as to enable each function to be executed. After that, the processing returns to step S304.

Until it is determined, by performing determination processing in step S304, that restoring processing has been completed for all the processes specified in the restoration order information, the processing in steps S305 to S308 is repeated. After that, the processing proceeds to the processing in step S309 and steps thereafter that are related to other processes not included in the restoration order information.

In step S309, the OS checks the content in the all-restoration instruction region 402. Accordingly, the OS obtains all-restoration information corresponding to the restoration factor ID held by the restoration factor register 305. After that, the processing proceeds to step S310.

In step S310, the OS determines whether or not all-restoration is to be performed based on the content in the all-restoration instruction region 402. Here, if the content indicates "not perform all-restoration", restoring processing for restoration from the hibernation state is completed by performing the above processing. On the other hand, if the content indicates "perform all-restoration", the processing proceeds to step S311.

In steps S311 to S315, the OS restores processes one by one for which restoring processing has not been completed among the processes that were being executed before switching to the hibernation state. First, in step S311, the OS determines whether or not a process exists for which restoring processing has not been completed. If restoring processing has been completed for all the processes, and no process exists that has not been restored, restoring processing for restoration from the hibernation state is complete. On the other hand, if a process exists for which restoring processing has not been completed yet, the processing proceeds to step S312.

In step S312, the OS selects a process to be restored next from among the processes for which restoring processing has not been completed. Note that a method for selecting a process is as described above. After that, the processing proceeds to step S313. Note that the processing in steps S313 to S315 is the same as the processing in steps S306 to S308. By performing the above processing, the OS resumes execution of the selected process, and the processing returns to step S311.

If execution of all the processes has been resumed by performing the processing in the above steps S311 to S315, restoration from the hibernation state is complete in the digital multi-function peripheral 100. Note that the processing in steps S303 to S315 corresponds to processing performed by a second restoration unit.

Figure 11:
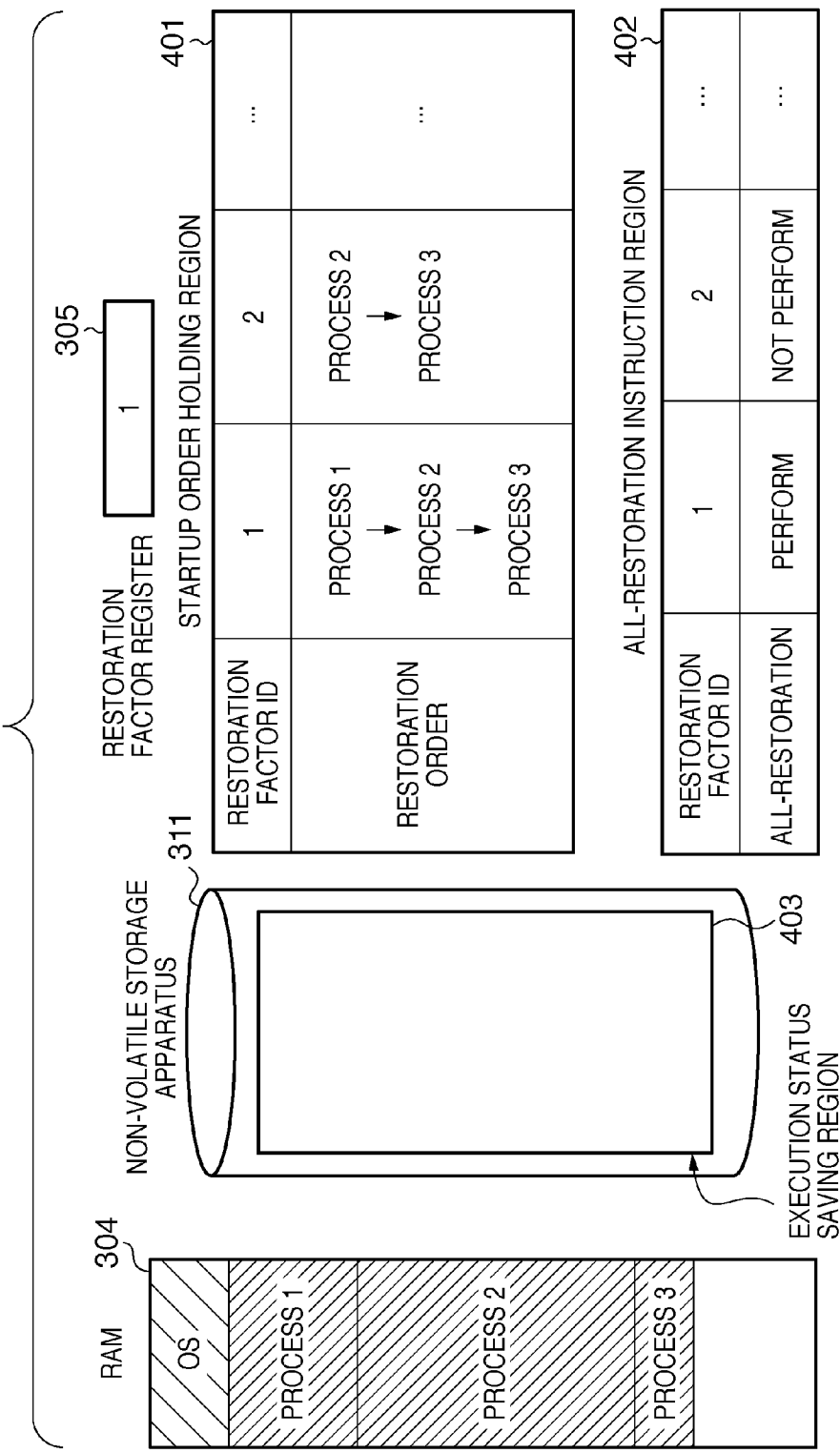
FIG. 11 is a diagram showing a state of the RAM 304 and a state of the execution status saving region 403 in a case where all the processes have been restored after restoration from the hibernation state has been completed according to the first embodiment.

FIG. 11 is a diagram showing the state of the RAM 304 and the state of the execution status saving region 403 in the case where all the processes have been restored after having completed restoration from the hibernation state according to the first embodiment. Note that FIG. 11 shows the result of restoring processing in the case where it is determined in step S310 that the content in the all-restoration instruction region 402 indicates "perform all-restoration". As shown in FIG. 11, when restoration from the hibernation state is complete, all the images stored in the non-volatile storage apparatus 311 have been transferred to the RAM 304.

Figure 12:
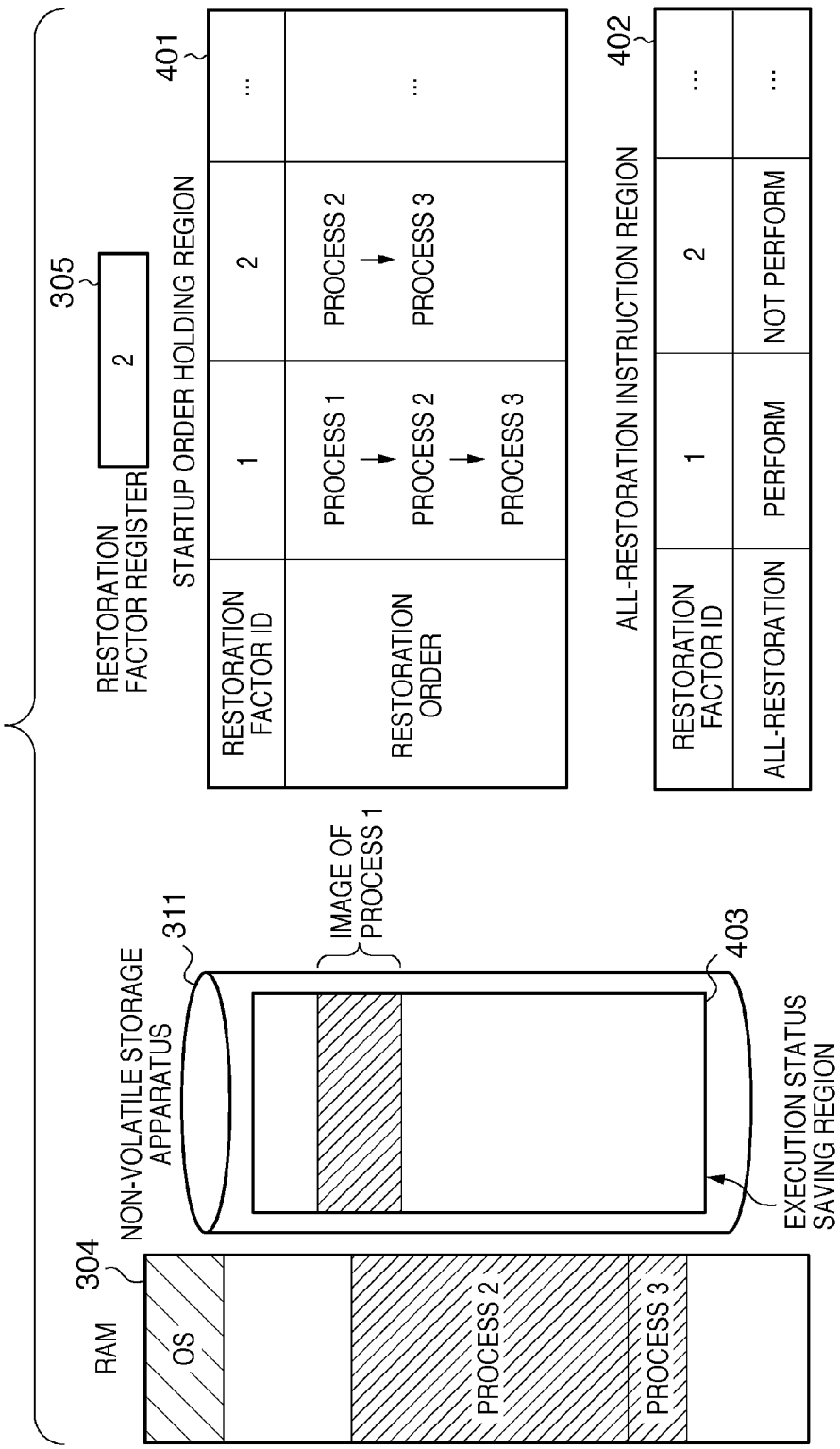
FIG. 12 is a diagram showing a state of the RAM 304 and a state of the execution status saving region 403 in a case where only some of the processes have been restored after restoration from the hibernation state has been completed according to the first embodiment.

On the other hand, FIG. 12 is a diagram showing the state of the RAM 304 and the state of the execution status saving region 403 in the case where only some processes have been restored after having completed restoration from the hibernation state according to the first embodiment. Note that FIG. 12 shows the result of restoring processing in the case where it is determined in step S310 that the content in the all-restoration instruction region 402 indicates "not perform all-restoration". When restoration from the hibernation state has been completed, only the images of processes to be restored have been transferred to the RAM 304 from among the processes stored in the non-volatile storage apparatus 311. In FIG. 12, only the images of Processes 2 and 3 have been transferred to the RAM 304, and the image of Process 1 remains in the non-volatile storage apparatus 311.

Note that if all-restoration is not performed, the OS again performs switching to the hibernation state after each process ends necessary processing, in response to an instruction from the processes. In other words, the OS again saves the images of the processes and the OS that have been restored to the RAM 304, in the non-volatile storage apparatus 311, and also stops power supply to the functional units.

As described above, at the time of restoration from the hibernation state, the information processing apparatus according to the present embodiment restores the execution status of only the OS to the RAM, and thereafter restores the execution statuses of processes to the RAM from the images of the processes in the OS. Specifically, the OS resumes the execution of each process after the transfer of its image from the non-volatile storage apparatus to the RAM has been completed. Accordingly, it is possible to preemptively resume the execution of a process for which transfer processing to the RAM has already been completed, before the completion of transfer processing for the images of all the other processes, and thus, for example, it is possible to shorten the waiting time for the user in the case where the user gives an instruction to perform restoring processing. Further, after execution of a process is resumed, transfer processing for an image of the process does not occur again, and accordingly the execution of the process does not stop again due to the occurrence of such transfer processing. Therefore, a process for which execution is resumed can smoothly continue its operation.

Further, the information processing apparatus according to the present embodiment holds, in advance for each restoration factor, information regarding the order in which processes are to be restored, and executes restoring processing for each process in accordance with the order. For example, if the restoration factor for restoration from the hibernation state is the operation unit being operated by the user, the information processing apparatus performs control such that a process that is more related to the operation of the operation unit is restored prior to a process that is less related thereto, such as a process related to network control. On the other hand, if the restoration factor for restoration from the hibernation state is the reception of a document print request from the user on the network, for example, the information processing apparatus performs control such that a process related to network control is restored prior to a process related to the operation unit, and the like. In other words, when the information processing apparatus is restored from the hibernation state, by restoring a process related to an operation executed by the user first, the waiting time that the user feels can be shortened. Furthermore, by setting the restoration order of the processes described above based on the ID numbers of the functional units, the information processing apparatus can adaptively switch the restoration order of the processes for each restoration factor, and can thereby be flexibly restored from the hibernation state.

Further, the information processing apparatus according to the present embodiment sets in advance for each restoration factor, in addition to the order of restoring processes, whether or not all the other processes that are not set in the above order are to be restored, and at the time of restoration from the hibernation state, executes restoring processing for the processes based on the setting. For example, if the restoration factor is the arrival of a FAX, it is desirable to automatically perform switching to the hibernation state again after reception processing for receiving the FAX is completed, in view of the reduction of power consumption of the information processing apparatus. In this case, regarding this restoration factor, the information processing apparatus performs setting in advance such that other processes that are not related to the operation of the FAX control unit are not restored, and only the processes related thereto are set in the restoration order, and thus restores only such processes. Furthermore, after the processes that have been restored have ended necessary processing, switching to the hibernation state is performed again. Accordingly, it is possible to realize an improvement in the responsiveness of the information processing apparatus and the reduction of the power consumption thereof.

Second Embodiment

In the first embodiment, a description is given regarding a case in which the CPU and the OS of the information processing apparatus do not have a virtual memory function. However, the present invention is not limited to the information processing apparatus that does not have virtual memory, and can also be applied to an information processing apparatus that has virtual memory. In view of this, in a second embodiment of the present invention, a description is given regarding a case in which the CPU and the OS of the information processing apparatus according to the first embodiment are provided with a virtual memory function. In the following, only the aspects of the second embodiment that are different from the first embodiment are described with reference to FIGS. 13 to 18.

Virtual memory is a type of a memory management technique, and is a technique for causing discontinuous memory regions to appear to be continuous from the viewpoint of a process in the OS. Further, by saving some of the content in the RAM 304 in an external storage device such as an HDD, a memory region larger than the RAM 304 mounted in the information processing apparatus is virtually provided.

Figure 13:
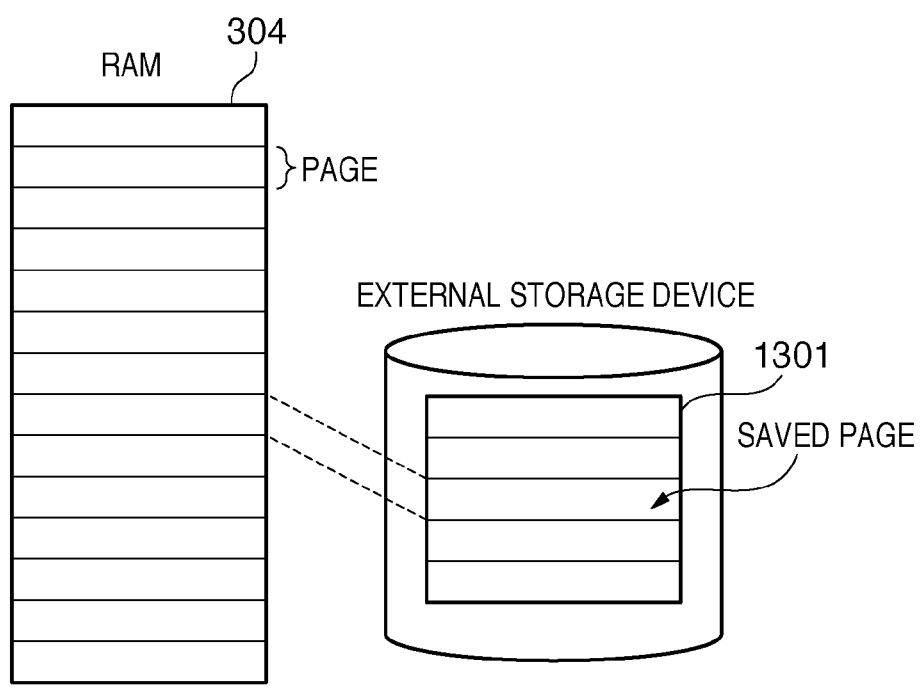
FIG. 13 is a diagram showing a concept of a virtual memory function according to a second embodiment.

FIG. 13 is a diagram showing the concept of the virtual memory function according to the second embodiment. As shown in FIG. 13, based on a memory region that has a capacity determined in advance as one unit, which is called a page, the OS of the present embodiment divides the RAM 304 into a plurality of memory regions, and manages the regions. Further, if a memory region larger than the capacity of the RAM 304 is necessary, the OS saves storage content in the RAM 304 in an external storage device 1301 in units of pages, and executes processing for restoring the content when necessary. Accordingly, the OS causes a memory region larger than the RAM 304 to appear to exist.

Figure 14:
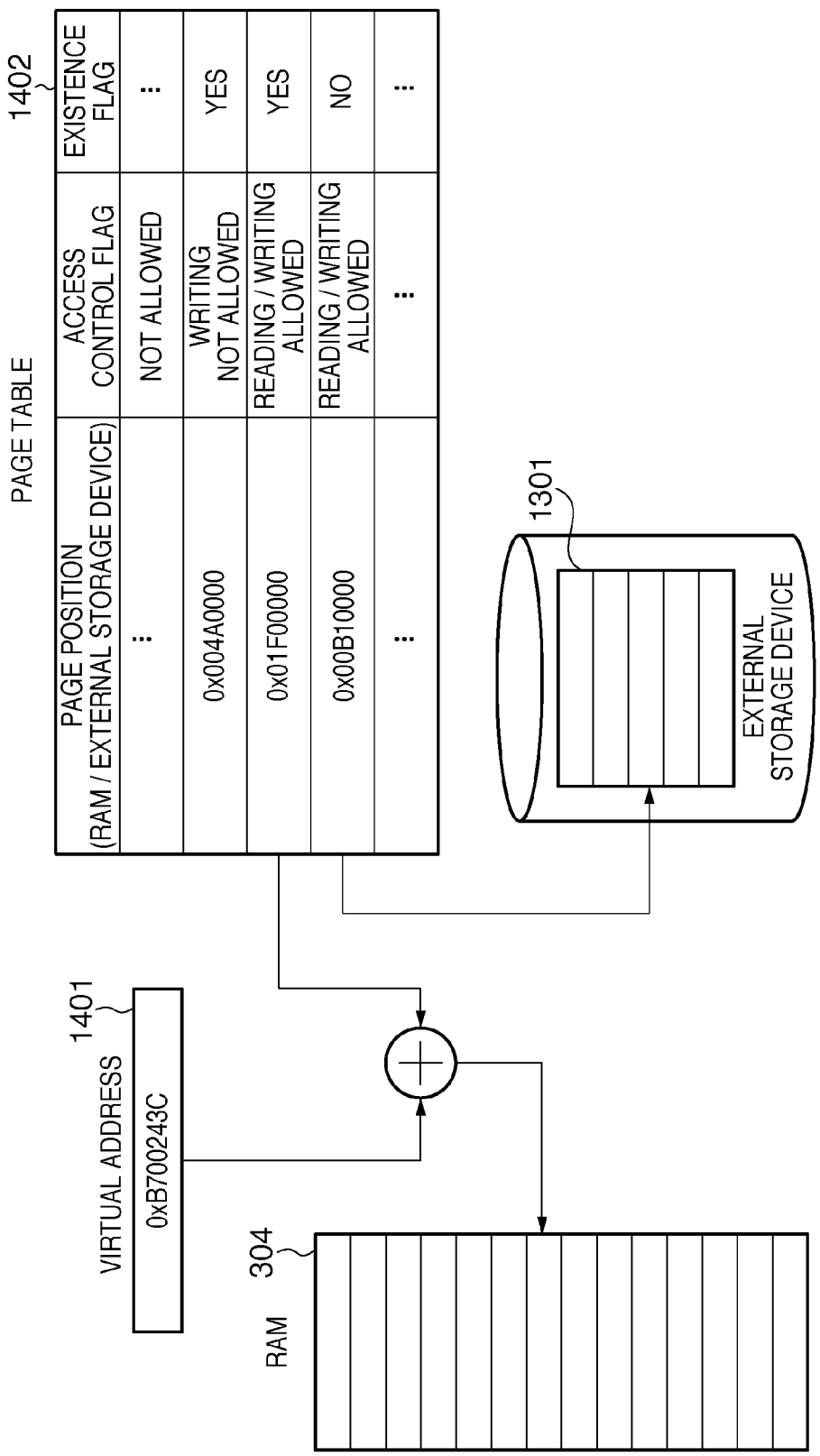
FIG. 14 is a diagram showing a concept of a page table of the virtual memory function according to the second embodiment.

The OS using virtual memory uses logical position information called a virtual address when the processes access the RAM 304. A virtual address is automatically converted into position information of a page in the RAM 304 by the CPU 301, which realizes access to any page in the RAM 304. Here, FIG. 14 is a diagram showing the concept of a page table of the virtual memory function according to the second embodiment. The CPU 301 performs the above converting process using a page table 1402, which is a conversion table for converting from a virtual address 1401 to a page position in the RAM 304. The page table 1402 exists in the RAM 304 for each process, and the OS causes discontinuous memory to appear to be continuous by appropriately setting each entry in the page table 1402.

Further, as shown in FIG. 14, in addition to the values that indicate page positions in the RAM 304, special bits for controlling operation of the virtual memory function, such as an access control flag and an existence flag, are assigned to entries in the page table 1402. The access control flag is a flag that controls access to each page, and write protection and the like in units of pages is controlled by setting an appropriate value to each bit. The OS can appropriately protect content in the RAM 304 and can safely execute programs by using the access control flag. Further, the existence flag is a value that indicates whether or not a page corresponding to the entry exists in the RAM 304. If the page is saved in the external storage device 1301, a value that indicates the position of a saving destination in the external storage device 1301 is held in the corresponding entry in the page table 1402, instead of the page position in the RAM 304. Further, the existence flag is set to a value that indicates that the page does not exist in the RAM 304.

Note that if a non-volatile storage apparatus such as an HDD is used as the external storage device 1301, when content in the RAM 304 is saved in the external storage device 1301 using the virtual memory function, the non-volatile storage apparatus 311 used for hibernation can be shared. In this case, a saving region for the virtual memory function is necessary in the non-volatile storage apparatus 311. For this reason, a dedicated region may be provided in the non-volatile storage apparatus 311, or the execution status saving region 403 utilized at the time of hibernation may be shared. In the present embodiment, a description is given regarding a case where a capacity greater than the capacity of the RAM 304 is assigned to the execution status saving region 403, and the execution status saving region 403 is shared as a saving region for the virtual memory function. According to such a mechanism, in the information processing apparatus provided with the virtual memory function, the RAM 304 can be flexibly used, and also memory utilization efficiency can be increased.

Figure 15:
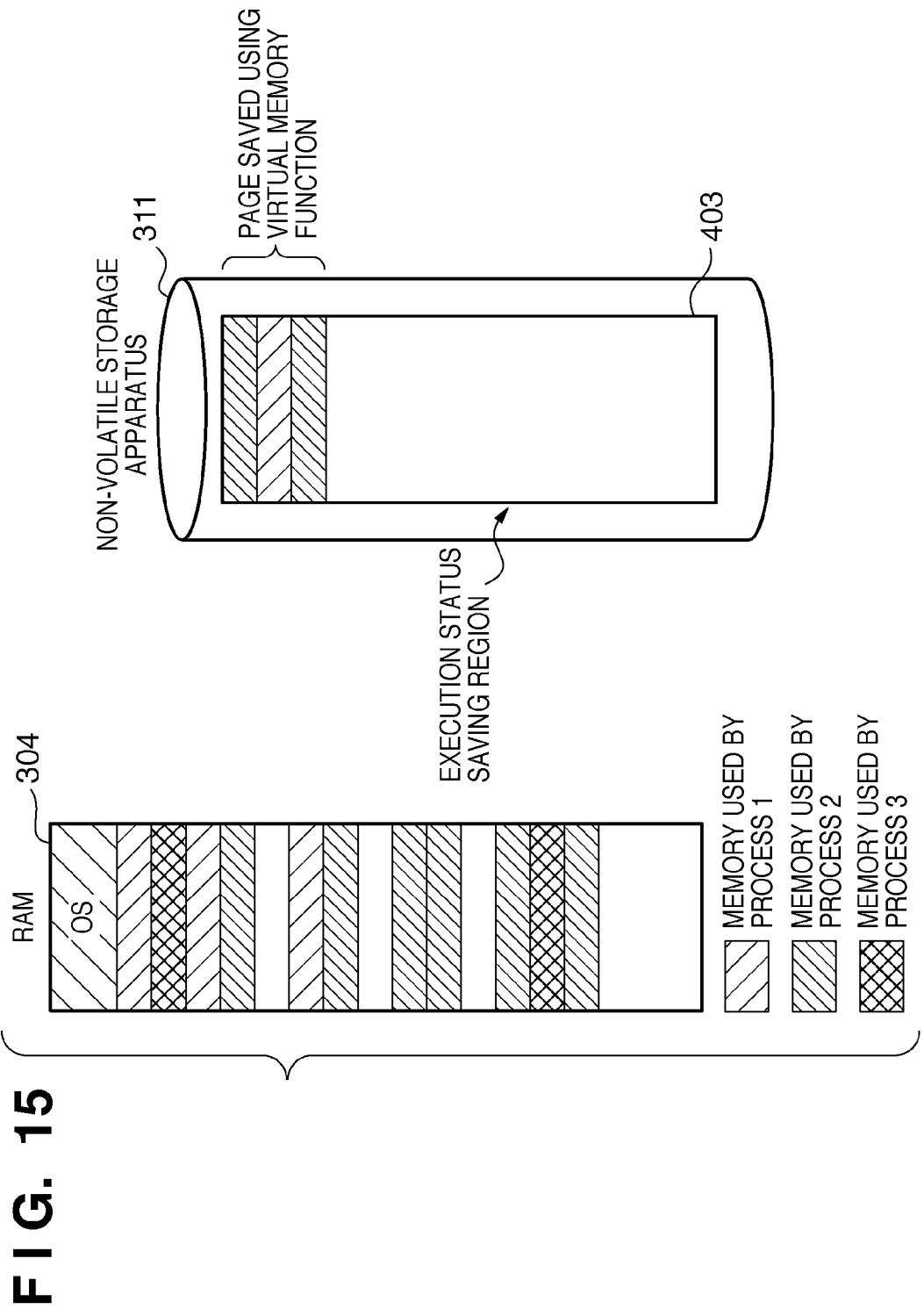
FIG. 15 is a diagram showing an example of a state of the RAM 304 and a state of the non-volatile storage apparatus 311 in a state where the digital multi-function peripheral 100 according to the second embodiment has been started up.

FIG. 15 is a diagram showing an example of the state of the RAM 304 and the state of the non-volatile storage apparatus 311 in the state where the digital multi-function peripheral 100 according to the second embodiment has been started up. As shown in FIG. 15, memory regions used by the processes are not necessarily in continuous positions in the RAM 304. Further, in the digital multi-function peripheral 100 in an active state, some of the content of the RAM 304 has been saved in the non-volatile storage apparatus 311 in units of pages using the virtual memory function.

Switching Processing for Switching to Hibernation State

Next, a description is given regarding switching processing for switching to the hibernation state of the present embodiment. In the digital multi-function peripheral 100 according to the present embodiment, since a processing procedure that the OS executes in order to perform switching to the hibernation state is almost the same as that in the first embodiment shown in FIG. 8, a description is given mainly regarding differences from the first embodiment.

Figure 16:
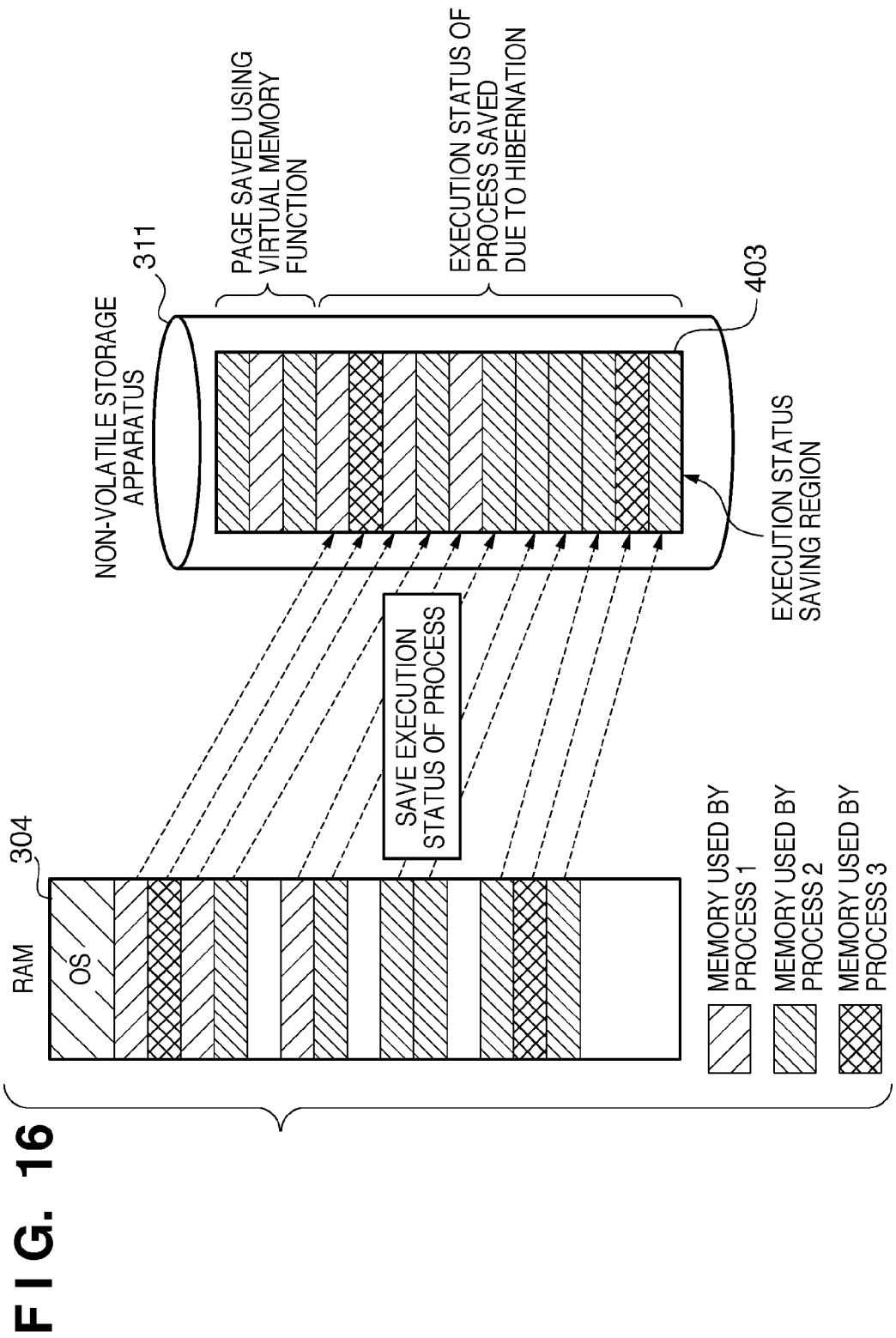
FIG. 16 is a diagram showing an example of a state of the RAM 304 and a state of the non-volatile storage apparatus 311 at a time of switching to the hibernation state in the digital multi-function peripheral 100 according to the second embodiment.

FIG. 16 is a diagram showing an example of the state of the RAM 304 and the state of the non-volatile storage apparatus 311 at the time of switching to the hibernation state in the digital multi-function peripheral 100 according to the second embodiment. A difference from the first embodiment is that when saving execution status information of a process in the execution status saving region 403 in step S201 shown in FIG. 8, the OS saves the information in units of pages in the RAM 304, not in units of processes. Note that also in the present embodiment, the OS can sort pages in the RAM 304 process by process, and save images process by process.

Figure 17:
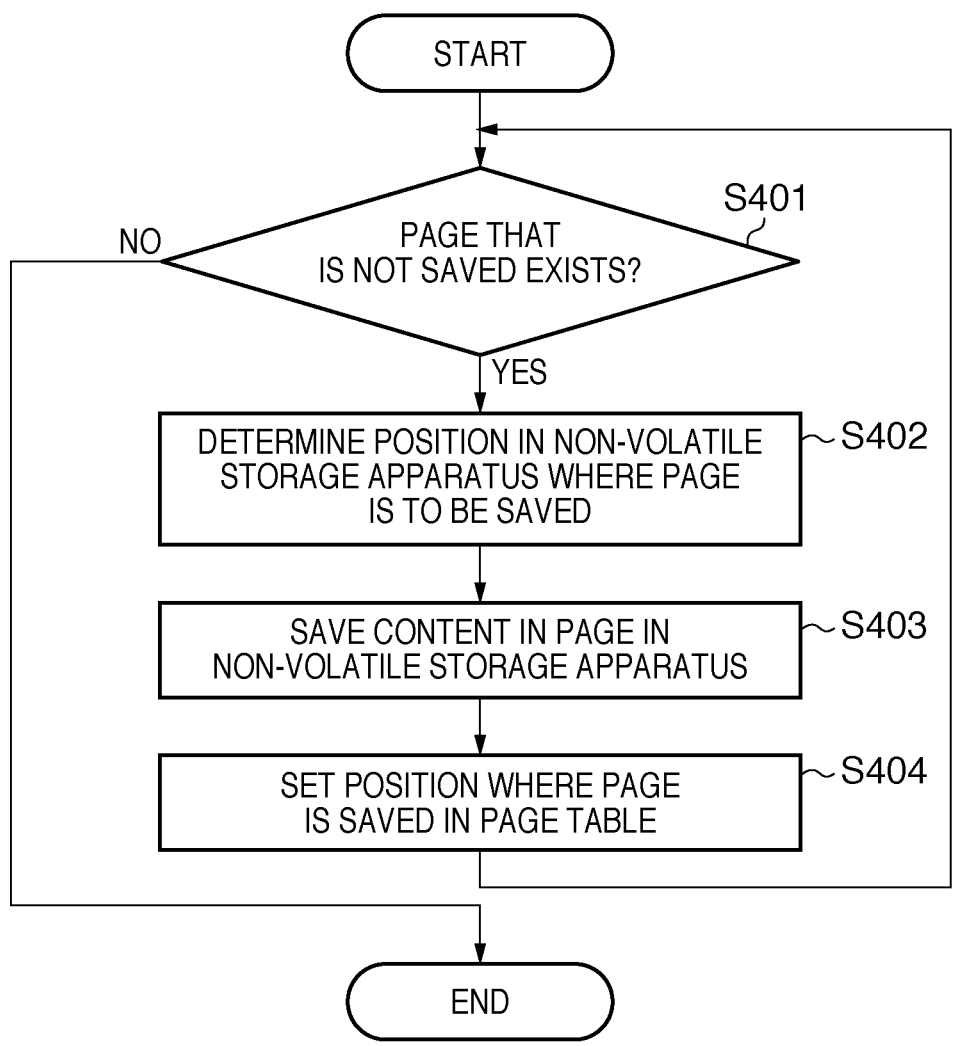
FIG. 17 is a flowchart showing a processing procedure performed at a time of saving an execution status of each process to the non-volatile storage apparatus 311 in the digital multi-function peripheral 100 according to the second embodiment.

FIG. 17 is a flowchart showing a processing procedure performed at a time of saving the execution status of each process in the non-volatile storage apparatus 311 in the digital multi-function peripheral 100 according to the second embodiment. Although processing regarding a specific process is described below, the processing procedure is the same for any process.

In step S401, the OS determines whether or not a page that is not saved in the non-volatile storage apparatus 311 exists in the RAM 304. If a page that is not saved does not exist, the OS completes saving of the execution status of the above process. On the other hand, if a page that is not saved exists, the processing proceeds to step S402, and the OS continues saving processing in units of pages.

In step S402, the OS determines the position of a saving destination in the non-volatile storage apparatus 311 for a page in the RAM 304. Furthermore, in step S403, the OS saves the page in the determined position in the non-volatile storage apparatus 311. After that, the processing proceeds to step S404.

In step S404, the OS sets a value that indicates the position of the saving destination in the non-volatile storage apparatus 311 in the entry of the page in the page table of the process, in place of the value that indicates the position in the RAM 304 that had been previously set. However, the OS does not change the value of the existence flag in the page table, and keeps the value indicating that the page exists in the RAM 304. After that, the processing returns to step S401, and the OS continues saving processing for a page that is not saved in the non-volatile storage apparatus 311 yet.

Note that in step S202 shown in FIG. 8, the page tables of the processes that exist in the RAM 304 are saved in the non-volatile storage apparatus 311 as a part of execution status information of the OS.

Restoring Processing for Restoration from Hibernation State

Next, a description is given regarding restoring processing for restoration from the hibernation state of the present embodiment. In the digital multi-function peripheral 100 according to the present embodiment, since a processing procedure for restoration from the hibernation state in the digital multi-function peripheral 100 is almost the same as that of the first embodiment shown in FIGS. 10A and 10B, the differences therebetween are mainly described.

In the present embodiment, when restoring the execution status of the OS in the RAM 304 in step S302 shown in FIG. 10A, the OS also restores the page tables of the processes from the images in the non-volatile storage apparatus 311. Further, when transferring the images of the processes to the RAM 304 in steps S306 and S313 shown in FIGS. 10A and 10B, the OS executes processing shown in FIG. 18 described below.

FIG. 18 is a flowchart showing a processing procedure performed at a time of restoring the execution status of each process in the RAM 304 in the digital multi-function peripheral 100 according to the second embodiment. The OS refers to the page table of a process selected to be restored, and executes the following processing based on the reference result. Note that the OS executes similar processing for all of the other processes as well.

In step S501, the OS determines whether or not an entry that has not been checked exists among the entries in a page table. If an entry that has not been checked does not exist, restoring processing for the process is complete. On the other hand, if an entry that has not yet been checked exists, the processing proceeds to step S502, and restoring processing for the pages is continued.

In step S502, the OS selects one entry from among the entries in the page table, and checks the content thereof. Furthermore, in step S503, the OS determines whether or not the existence flag in the page table is a value indicating that this page exists in the RAM 304. If the existence flag is not a value indicating that the page exists in the RAM 304, the processing returns to step S501, and the OS continues processing regarding the next entry. On the other hand, if the existence flag is a value indicating that the page exists in the RAM 304, the processing proceeds to step S504.

In step S504, the OS restores the content of the page that exists at the position indicated by the entry in the non-volatile storage apparatus 311 to the RAM 304. Furthermore, in step S505, the OS sets the position of the restoration destination of the page in the RAM 304, in the entry in the page table. Note that the position of the page in the RAM 304 at the time of restoring the page is not necessarily the same position as that before hibernation. After that, the processing returns to step S501, and processing regarding the next entry is continued.

By performing the above processing, the OS executes restoring processing for restoration in the RAM 304 in units of pages for all the entries in the page table. The state of the RAM 304 after completion of restoring processing is the same as that from before switching to the hibernation state in terms of the process that has been restored. Accordingly, the execution status of the process is reconstructed in the RAM 304, and execution of the process can be resumed.

As described above, the information processing apparatus that has a virtual memory function according to the present embodiment, similar to the first embodiment, can resume the execution of each process after the images thereof have been restored, without waiting for all the images to be restored. Furthermore, in the case where the storage region of the RAM is used in units of pages using the virtual memory function, the information processing apparatus can increase the utilization efficiency of the RAM by making it possible to utilize a page table used for the virtual memory function at the time of switching to the hibernation state and restoration from the hibernation state.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-098488, filed Apr. 14, 2009, which is hereby incorporated by reference herein in its entirety.

What is claimed is:
1. An information processing apparatus comprising:
a first storage unit in which an operating system that executes first and second processes and first and second execution programs of the first and second processes are loaded;
a second storage unit that, in a case where the information processing apparatus shifts into a power saving state in which power is not supplied to a device included in the information processing apparatus, stores execution status information of the operating system loaded in said first storage unit, execution status information of the first process, and execution status information of the second process;
a determination unit that determines an order of restoring the first process and the second process based on a factor by which the information processing apparatus returns from the power saving state;
a first restoration unit that, in a case where the information processing apparatus returns from the power saving state, transfers the execution status information of the operating system from said second storage unit to said first storage unit, and restores the operating system to a state of execution using the execution status information transferred to said first storage unit; and a second restoration unit that transfers, in accordance with the order determined by the determination unit, the execution status information of the first process and the execution status information of the second process from said second storage unit to said first storage unit, restores the first process to a state of execution using the execution status information of the first process transferred to said first storage unit before completion of transferring the execution status information of the second process, and restores the second process to a state of execution using the execution status information of the second process transferred to said first storage unit after the first process has been restored, wherein the operating system includes a virtual memory function that divides a storage region of said first storage unit into pages, each page being a region that is a predetermined storage capacity, and uses the pages and a part of a storage region of said second storage unit as the storage region of said first storage unit based on a page table for each process for managing position information of a page that is used, and wherein said second storage unit stores the execution status information of the first process and the execution status information of the second process in units of pages.

2. The information processing apparatus according to claim 1, wherein said second restoration unit transfers the execution status information of the first process and the execution status information of the second process from said second storage unit to said first storage unit in units of pages, and resumes execution from a process for which transfer of all the execution status information to be used in units of pages is complete.

3. The information processing apparatus according to claim 1, wherein said second storage unit further stores restoration factors for causing the information processing apparatus to resume from the power saving state, and order information respectively associated with each restoration factor and indicating an order of restoration of the first and second processes, and wherein said second restoration unit restores the first and second processes based on the order information associated with a restoration factor when the information processing apparatus resumes from the power saving state.

4. The information processing apparatus according to claim 3, wherein said second storage unit stores all-restoration information that indicates whether a third process that is not included in the order information is to be restored, and wherein said second restoration unit, in a case where the all-restoration information indicates that the third process is to be restored, restores the third process after restoring the first and second processes.

5. The information processing apparatus according to claim 4, wherein said second restoration unit, in a case where the all-restoration information indicates that the third process is not to be restored, restores the first and second processes included in the order information, and returns the first and second processes to the power saving state again after processing by the restored first and second processes ends.

6. The information processing apparatus according to claim 1, further comprising a printer unit that prints an image on a sheet, wherein power supply to the printer unit is stopped in the power saving state.

7. The information processing apparatus according to claim 1, wherein the power saving state is a hibernation state.

8. The information processing apparatus according to claim 1, wherein said second storage unit is a non-volatile storage unit.

9. The information processing apparatus according to claim 1, wherein said first storage unit is a non-volatile storage unit.

10. A method for controlling an information processing apparatus including a first storage unit in which an operating system that executes first and processes and first and second execution programs of the first and second processes are loaded, the method comprising:

in a case where the information processing apparatus shifts into a power saving state in which power is not supplied to a device included in the information processing apparatus, storing, in a second storage unit of the information processing apparatus, execution status information of the operating system loaded in said first storage unit, execution status information of the first process, and execution status information of the second process;

determining an order of restoring the first process and the second process based on a factor by which the information processing apparatus returns from the power saving state;

in a case where the information processing apparatus returns from the power saving state, transferring the execution status information of the operating system from the second storage unit to the first storage unit, and restoring the operating system to a state of execution using the execution status information transferred to the first storage unit; and transferring, in accordance with the order determined in the determining step, the execution status information of the first process and the execution status information of the second process from the second storage unit to the first storage unit, restoring the first process to a state of execution using the execution status information of the first process transferred to the first storage unit before completion of transferring the execution status information of the second process, and restoring the second process to a state of execution using the execution status information of the second process transferred to the first storage unit after the first process has been restored, wherein the operating system includes a virtual memory function that divides a storage region of the first storage unit into pages, each page being a region that is a predetermined storage capacity, and uses the pages and a part of a storage region of the second storage unit as the storage region of the first storage unit based on a page table for each process for managing position information of a page that is used, and wherein the second storage unit stores the execution status information of the first process and the execution status information of the second process in units of pages.

11. A non-transitory computer-readable storage medium storing an executable computer program for causing a computer to execute the method for controlling the information processing apparatus according to claim 10.

12. An information processing apparatus which can shift into a power saving state, the information processing apparatus comprising:

a main storage unit in which an operating system that can execute a plurality of processes is loaded;

a non-volatile storage unit that stores execution statuses of the plurality of processes executed by the operating system loaded in said main storage unit;

a control unit that, in a case of causing the information processing apparatus to shift into the power saving state, saves the execution statuses of the plurality of processes from said main storage unit to said non-volatile storage unit; and a determination unit that determines an order of restoring the plurality of processes based on a factor by which the information processing apparatus is resumed from the power saving state, wherein, in a case of causing the information processing apparatus to resume from the power saving state, said control unit further transfers the execution statuses of the plurality of processes in accordance with the order determined in the determining step one by one to said main storage unit, and further resumes execution of a process from a process for which transfer of an execution status is complete, wherein the operating system further includes a virtual memory function that divides a storage region of said main storage unit in units of pages, the page unit being a region obtained by performing division that is a predetermined storage capacity, and uses the pages, and uses a part of a storage region of said non-volatile storage unit as the storage region of said main storage unit based on a page table for each process for managing position information of a page that is used, and wherein, in a case of causing the information processing apparatus to shift into the power saving state, said control unit saves the execution status information of each process from said main storage unit to said non-volatile storage unit in units of pages.

13. The information processing apparatus according to claim 12, wherein restoration factors that cause restoration from the power saving state, and order information that, for each restoration factor, indicates an order in which at least one or more processes are restored from the power saving state are stored in advance in said non-volatile storage unit, and wherein said control unit reads out the order information corresponding to one of the restoration factors from said non-volatile storage unit, and restores the plurality of processes to a state of execution in accordance with the order information.

14. The information processing apparatus according to claim 13, wherein all-restoration information that indicates whether a process that is not included in the order information is also to be restored together with a process included in the order information at a time of restoration from the power saving state, is further stored in said non-volatile storage unit, and wherein said control unit, in a case where the all-restoration information indicates that the process that is not included in the order information is also to be restored, restores the process that is not included in the order information after restoring the process included in the order information.

15. The information processing apparatus according to claim 14, wherein said control unit, in a case where the all-restoration information indicates that only the process included in the order information is to be restored, restores only the process included in the order information, and when processing performed by the restored process ends, returns the process to the power saving state again.

16. The information processing apparatus according to claim 12, wherein, in a case of causing the information processing apparatus to resume from the power saving state, said control unit transfers the execution status information of each process from said non-volatile storage unit to said main storage unit in units of pages, and resumes execution from a process for which transfer of all the execution status information to be used in units of pages is complete.

17. The information processing apparatus according to claim 16, wherein in a case of causing the information processing apparatus to shift into the power saving state, said control unit sets, when saving the execution status information of each process to said non-volatile storage unit in units of pages, position information of a saving destination in the storage region of said non-volatile storage unit in the page table of the process, and wherein in a case of causing the information processing apparatus to resume from the power saving state, said control unit sets, when restoring the execution status information of each process from said non-volatile storage unit to said main storage unit in units of pages, position information of a restoration destination in the storage region of said main storage unit in the page table of the process.

18. The information processing apparatus according to claim 12, wherein the power saving state is a hibernation state in which power supply to said main storage unit is stopped.

19. A method for controlling an information processing apparatus which can shift into a power saving state, the method comprising:

loading, in a main storage unit, an operating system that can execute a plurality of processes;

in a case of causing the information processing apparatus to shift into the power saving state, saving execution statuses of the plurality of processes executed by the operating system loaded in the main storage unit from the main storage unit to a non-volatile storage unit;

determining an order of restoring the plurality of processes based on a factor by which the information processing apparatus is resumed from the power saving state; and in a case of causing the information processing apparatus to resume from the power saving state, transferring the execution statuses of the plurality of processes in accordance with the order determined in the determining step one by one to the main storage unit, and resuming execution of a process from a process for which transfer of an execution status is complete, wherein the operating system further includes a virtual memory function that divides a storage region of the main storage unit in units of pages, the page unit being a region obtained by performing division that is a predetermined storage capacity, and uses the pages, and uses a part of a storage region of the non-volatile storage unit as the storage region of the main storage unit based on a page table for each process for managing position information of a page that is used, and wherein, in a case of causing the information processing apparatus to shift into the power saving state, said saving step saves the execution status information of each process from the main storage unit to the non-volatile storage unit in units of pages.

* * * * *